United States Patent
Nishikawa

(10) Patent No.: US 9,770,017 B2
(45) Date of Patent: Sep. 26, 2017

(54) RECIPROCATING MECHANISM FOR A FISHING REEL

(71) Applicant: Shimano Inc., Sakai, Osaka (JP)

(72) Inventor: Tomohiro Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/150,818

(22) Filed: May 10, 2016

(65) Prior Publication Data
US 2016/0345561 A1    Dec. 1, 2016

(30) Foreign Application Priority Data
May 29, 2015   (JP) .................... 2015-110581

(51) Int. Cl.
*A01K 89/01*    (2006.01)

(52) U.S. Cl.
CPC .... *A01K 89/01143* (2015.05); *A01K 89/0114* (2013.01); *A01K 89/01141* (2015.05)

(58) Field of Classification Search
CPC ... A01K 89/01; A01K 89/0114; A01K 89/012
See application file for complete search history.

(56) References Cited

U.S. PATENT DOCUMENTS

| | | | | |
|---|---|---|---|---|
| 4,114,825 A | * | 9/1978 | Murvall | A01K 89/0114 242/242 |
| 5,012,990 A | * | 5/1991 | Kawabe | A01K 89/0114 242/242 |
| 5,364,041 A | | 11/1994 | Hitomi | |
| 5,564,639 A | * | 10/1996 | Yamaguchi | A01K 89/0114 242/241 |
| 5,601,244 A | | 2/1997 | Kawabe et al. | |
| 2003/0122010 A1 | * | 7/2003 | Wiest | A01K 89/0114 242/242 |
| 2004/0035968 A1 | * | 2/2004 | Takikura | A01K 89/0114 242/242 |
| 2005/0045758 A1 | * | 3/2005 | Ban | A01K 89/0114 242/242 |

FOREIGN PATENT DOCUMENTS

JP    2009-55848 A    3/2009

OTHER PUBLICATIONS

European Search Report of corresponding EP Application No. 16 17 1268.2 dated Sep. 27, 2016.

* cited by examiner

*Primary Examiner* — Emmanuel M Marcelo
(74) *Attorney, Agent, or Firm* — Global IP Counselors, LLP

(57) ABSTRACT

A reciprocating mechanism for a fishing reel includes a first rotating body, a second rotating body, a rotation transmission body, and a movable body. The first rotating body is configured to rotate in conjunction with a winding operation of a handle of the fishing reel. The second rotating body is arranged spaced apart from the first rotating body along a spool shaft direction in which a spool shaft of the fishing reel extends. The rotation transmission body is bridged between the first rotating body and the second rotating body, and is configured to transmit the rotation of the first rotating body to the second rotating body. The movable body is configured to engage the rotation transmission body, and is configured to reciprocate in the spool shaft direction accompanying an actuation of the rotation transmission body.

9 Claims, 4 Drawing Sheets

RECIPROCATING MECHANISM FOR A FISHING REEL

CROSS-REFERENCE TO RELATED APPLICATIONS

This application claims priority based on Japanese Patent Application No. 2015-110581, filed in the Japan Patent Office on May 29, 2015, the contents of which are hereby incorporated herein by reference.

BACKGROUND

Field of the Invention

The present invention relates to a reciprocating mechanism for a fishing reel.

Background Information

In general, a spinning reel comprises a reciprocating mechanism that reciprocates a spool in the longitudinal direction relate to a reel body, in order to uniformly wind a fishing line onto a spool (refer to Japanese Published Unexamined Application No. 2009-55848). A conventional reciprocating mechanism mainly comprises a rotary drive mechanism (first rotating body), a rotary driven body (second rotating body), an intermediate transmission body (rotation transmission body), and a sliding body (movable body). A rotary drive body is rotated by a rotation of a handle shaft. The rotary driven body is disposed spaced apart from the rotary drive body. An intermediate transmission body transmits the rotation of the rotary drive body to the rotary driven body. A sliding body is disposed on a spool shaft and engaged with the rotary driven body.

SUMMARY

In a conventional reciprocating mechanism, the sliding body is engaged with the rotary driven body. Specifically, the rotary driven body comprises an engagement projection, and the sliding body comprises a cam groove with which an engagement projection engages. The cam groove is formed in a vertically long Z-shape, which extends in a direction that is substantially perpendicular to the spool shaft direction.

In this configuration, when the rotary driven body is rotated by the rotation of the rotary drive body, the engagement projection of the rotary driven body moves along the cam groove of the sliding body in the direction in which the cam groove of the sliding body extends. That is, a direction which is substantially perpendicular to the spool shaft direction (a direction that is perpendicular to the spool shaft). Then, a sliding body moves in the longitudinal direction along with the spool shaft.

In this case, the movement amount of a sliding body in the longitudinal direction, that is, the stroke amount of a spool, is set by adjusting the length of the cam groove of the sliding body in a direction that is perpendicular to the spool shaft. For example, as the length of the cam groove of the sliding body is set longer, the stroke amount of the spool increases.

However, if the length of the cam groove of the sliding body is set long, it is necessary to set the sliding body long in the direction that is perpendicular to the spool shaft, Further, if the engagement projection of the rotary driven body is moved in a range in which the cam groove of the sliding body extends, it is necessary to increase the diameter of the rotary driven body. That is, there is the problem that, in order to increase the stroke amount of the spool in a conventional reciprocating mechanism, the size of the reciprocating mechanism increases in a direction that is perpendicular to a spool shaft.

The present invention was made in light of the above-described problems, and the object of the present invention is to provide a reciprocating mechanism that can be reduced in size in a direction that is perpendicular to a spool shaft.

(1) A reciprocating mechanism for a fishing reel according to one aspect of the present invention comprises a first rotating body, a second rotating body, a rotation transmission body, and a movable body. The first rotating body is rotated in conjunction with a winding operation of a handle. The second rotating body is disposed along the spool shaft direction along which a spool shaft extends, spaced apart from the first rotating body. A rotation transmission body is bridged to the first rotating body and the second rotating body, and transmits the rotation of the first rotating body to the second rotating body. A movable body engages with the rotation transmission body, and is reciprocated in the spool shaft direction accompanying the actuation of the rotation transmission body, In the present reciprocating mechanism, when a winding operation of the handle is carried out, the first rotating body is rotated in conjunction with a winding operation. Then, the second rotating body is rotatably supported via the rotation transmission body. Then, the movement direction which engages the rotation transmission body is reciprocated in the spool shaft direction.

Thus, in the present reciprocating mechanism, the movement amount of the movable body in the spool shaft direction, that is, the stroke amount of the spool, is set by adjusting an interval between the first rotating body and the second rotating body in the spool shaft direction, For example, the stroke amount of the spool is increased as the above-described interval is increased. In this manner, it is possible to increase the stroke amount of the spool without changing the size of the reciprocating mechanism in the direction that is perpendicular to the spool shaft. That is, compared to the conventional technology, the size of the reciprocating mechanism can be reduced in the direction that is perpendicular to the spool shaft, (2) A reciprocating mechanism for a fishing reel according to another aspect of the present invention preferably further comprises an engagement body. The engagement body engages the rotation transmission body and the movable body.

In this embodiment, the rotation transmission body and the movable body are engaged by the engagement body. It is thereby possible to reliably reciprocate the movable body in the spool shaft direction by the engagement body when actuating the rotation transmission body.

(3) In a reciprocating mechanism for a fishing reel according to another aspect of the present invention, the rotation transmission body preferably comprises an annular portion and a protrusion disposed on the outer perimeter part of the annular portion. The engagement body engages with the protrusion.

In this embodiment, the engagement body can be easily disposed on the outer perimeter part of the annular portion of the rotation transmission body via the protrusion of the rotation transmission body.

(4) In a reciprocating mechanism for a fishing reel according to another aspect of the present invention, the rotation transmission body preferably comprises the annular portion and a pair of protrusions that are disposed on the outer perimeter part of the annular portion. The engagement body is engaged between the pair of protrusions.

In this embodiment, the engagement body can be easily disposed the outer perimeter part of the annular portion of the rotation transmission body via the protrusion of the rotation transmission body.

(5) In a reciprocating mechanism for a fishing reel according to another aspect of the present invention, the movable body preferably comprises a groove portion that extends in a direction that crisscrosses with the spool shaft. The engagement body engages the groove portion so as to be movable along the groove portion.

In this embodiment, even if the groove portion extends in the direction that crisscrosses with the spool shaft, it is possible to set the stroke amount of the spool without changing the length of the groove portion, by adjusting the interval between the first rotating body and the second rotating body in the spool shaft direction. That is, compared with the conventional technology, the size of the reciprocating mechanism can be reliably reduced in the direction that is perpendicular to the spool shaft.

(6) In a reciprocating mechanism for a fishing reel according to another aspect of the present invention, the rotation transmission body preferably comprises an annular portion and a recess that is disposed on an inner perimeter part of the annular portion. The first rotating body comprises a first tooth portion that meshes with the recess.

In this embodiment, the rotation of the first rotating body can be reliably transmitted to the annular portion of the rotation transmission body by the meshing of the first tooth portion and the recess.

(7) In a reciprocating mechanism for a fishing reel according to another aspect of the present invention, the second rotating body preferably comprises a second tooth portion that meshes with the recess.

In this embodiment, the rotation of the first rotating body can be reliably transmitted from the annular portion of the rotation transmission body to the second rotating body by the meshing of the second tooth portion and the recess.

(8) A reciprocating mechanism for a fishing reel according to another aspect of the present invention preferably further comprises a housing. The housing is capable of housing the first rotating body, the second rotating body, and the rotation transmission body.

In this embodiment, since a belt is guided by the housing, even if failure occurs when the movable body is moved in the spool shaft direction and sagging or the like occurs in the belt, disengagement (becoming unmeshed) from the first rotating body and the second rotating body can be prevented.

(9) A reciprocating mechanism for a fishing reel according to another aspect of the present invention preferably further comprises a rotation transmission mechanism. The rotation transmission mechanism transmits the rotation from the drive shaft, which is rotated in conjunction with the winding operation of the handle, to the first rotating body.

In this embodiment, even if the drive shaft and the first rotating body are arranged separated from each other, the rotation from the drive shaft can be reliably transmitted to the first rotating body by the rotation transmission mechanism.

With the reciprocating mechanism of the present invention, the size of the reciprocating mechanism can be reduced in the direction that is perpendicular to the spool shaft.

BRIEF DESCRIPTION OF THE DRAWINGS

Referring now to the attached drawings which form a part of this original disclosure.

Referring now to the attached drawings which form a part of this original disclosure.

DETAILED DESCRIPTION OF THE EMBODIMENTS

Schematic Configuration of the Spinning Reel

Figure 1:
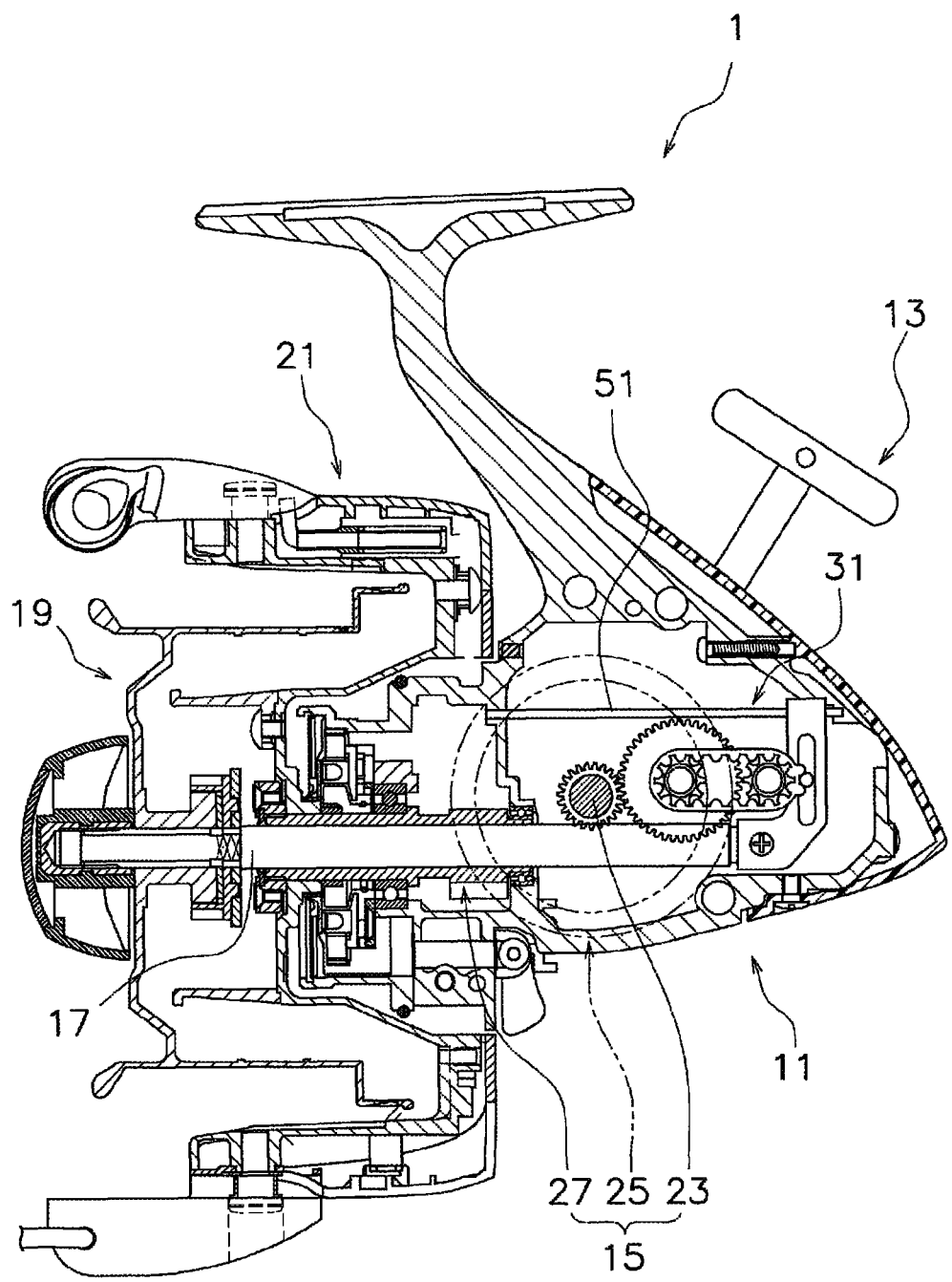
FIG. 1 is a lateral cross-sectional view of a spinning reel according to an embodiment of the present invention.

A spinning reel 1 according to an embodiment of the present invention is a reel that can unreel (cast) a fishing line in the forward direction. As shown in FIG. 1, the spinning reel 1 comprises a reel body 11, a handle 13, a rotary drive mechanism 15, a spool 19 having a spool shaft 17, a rotor 21, and an oscillating mechanism 31 (one example of a reciprocating mechanism).

Herein below, the direction in which fishing line is cast may be referred to as "front (left side in FIG. 1)" and the direction that is opposite of the direction in which fishing line is unreeled forward (reeled) may be referred to as "rear (right side in FIG. 1)." In addition, the side onto which the reel body 11 is mounted to a fishing rod may be referred to as "up (upper side in FIG. 1)" and the direction that is opposite of the side onto which the reel body 11 is mounted to a fishing rod may be referred to as "down (lower side in FIG. 1)."

Further, the direction in which the spool shaft 17 extends (spool shaft direction), the direction in which a pinion gear 27 extends (pinion gear direction, and the direction in which a guide shaft 51 extends (guide shaft direction are substantially the same direction. Accordingly, these directions are referred to as the "axial direction" below.

The reel body 11 rotatably supports the handle 13 and the rotor 21. Further, the reel body 11 supports the spool 19 so as to be reciprocally movable in the axial direction. The handle 13 is rotatably supported to the reel body 11 around an axis that extends in a direction perpendicular to the axial direction for example, an axis that is perpendicular to the sheet in FIG. 1).

The rotary drive mechanism 15 transmits the rotation of the handle 13 to the rotor 21 and the oscillating mechanism 31. The rotary drive mechanism 15 comprises a drive shaft 23, a drive gear 25, and the pinion gear.

The drive shaft 23 is rotated in conjunction with a winding operation of the handle 13. Specifically, the drive shaft 23 is coupled to the handle 13 so as to be integrally rotatable therewith.

The drive gear 25 comprises a face gear. The drive gear 25 integrally rotated with the drive shaft 23. The pinion gear 27 is a tubular gear that meshes with the drive gear 25. The pinion gear 27 is rotatably supported to the reel body 11. The spool shaft 17 extends through the inner perimeter part of the pinion gear 27. The rotor 21 is coupled to a pinion gear 133 so as to be integrally rotatable with the pinion gear 27.

The spool 19 is disposed in front of the reel body 11, and is reciprocated in the axial direction together with the spool shaft 17. At this time, the fishing line is uniformly wound on the spool 19, by the rotor 21 being rotated on the outer perimeter side of the spool 19 and the spool 19 being reciprocated in the axial direction. Specifically, the spool 19 is coupled to one end of the spool shaft 17. The oscillating mechanism 31 is coupled to the other end of the spool shaft 17. The spool shaft 17 is reciprocated in the axial direction in the inner perimeter part of the pinion gear 27 by the oscillating mechanism 31.

Configuration of the Oscillating Mechanism

The oscillating mechanism 31 evenly winds the fishing line onto the spool 19. The oscillating mechanism 31 reciprocates the spool 19 in the axial direction with the rotation of the handle 13, via the spool shaft 17.

Figure 2:
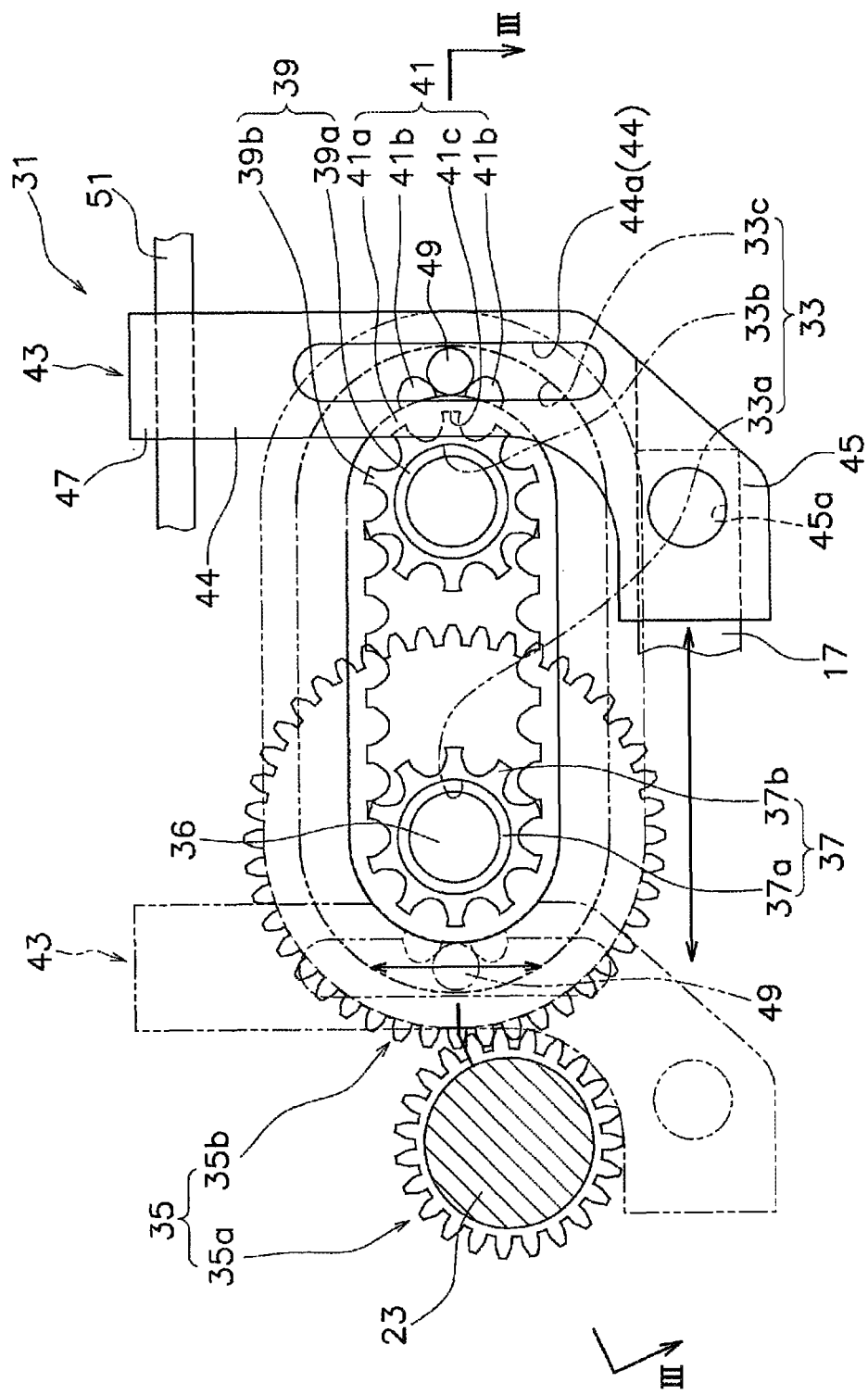
FIG. 2 is a side view of an oscillating mechanism.
Figure 3:
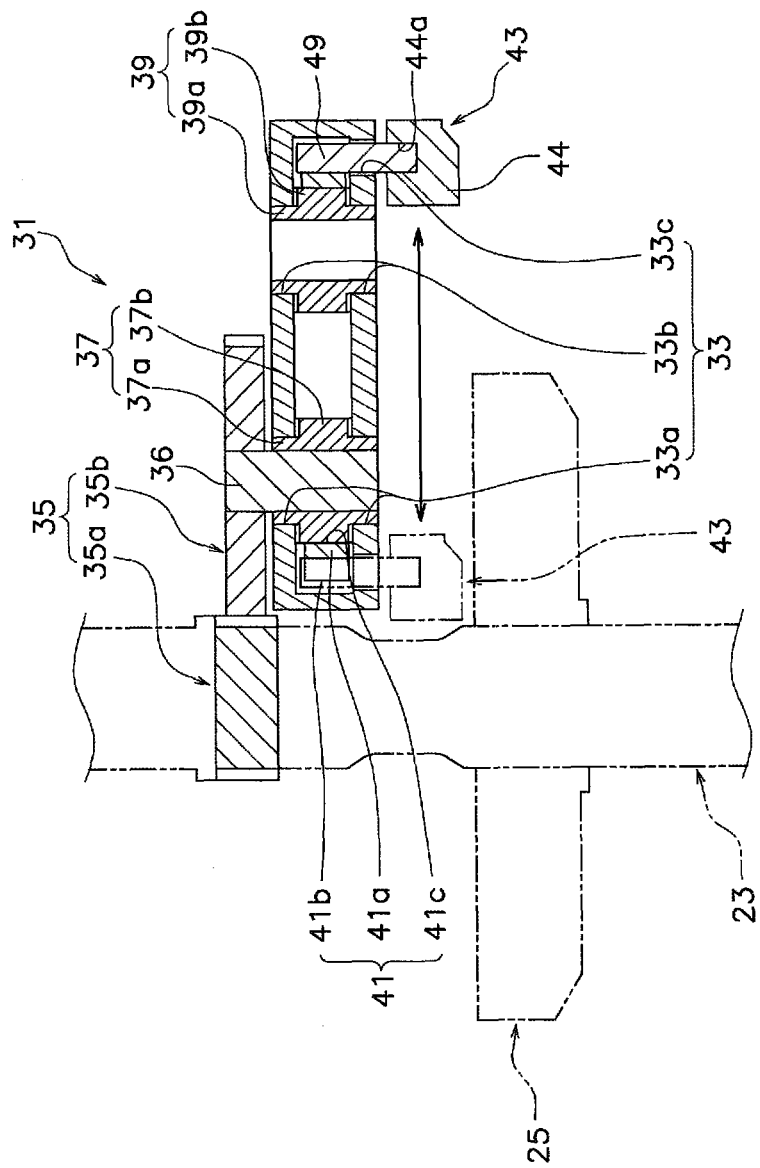
FIG. 3 is a cross-sectional view of an oscillating mechanism (the position of the section line III-III in FIG. 2).

As shown in FIG. 1 to FIG. 3, the oscillating mechanism 31 comprises a housing 33, a rotation transmission mechanism 35, a first pulley 37 (one example of a first rotating body), a second pulley 39 (one example of a second rotating body), a belt 41 (one example of a rotation transmission body), a slider 43 (one example of a movable body), an engagement pin 49 (one example of an engagement body), and the guide shaft 51. Meanwhile, for the convenience of illustration, the housing 33 is omitted in FIG. 1, and the housing 33 is illustrated by the two-dotted line in FIG. 2.

The housing 33 shall be capable of housing the first pulley 37, the second pulley 39, and the belt 41. Specifically, as shown in FIG. 2 and FIG. 3, the housing 33 comprises a pair of first hole portions 33a, a pair of second hole portions 33b, and a guide hole 33c. The pair of first hole portions 33a rotatably supports the first pulley 37. The pair of second hole portions 33b are spaced apart from the pair of first hole portions 33a along the axial direction. The pair of second hole portions 33b rotatably supports the second pulley 39.

The guide hole 33c guides the engagement pin 49. As shown in FIG. 2, when viewing the housing 33 along the rotational shaft of the first pulley 37 and/or the rotational shaft of the second pulley 39 (for example, along an axis that is perpendicular to a sheet in FIG. 2), the guide hole 33c is formed along the belt 41 in a non-circular shape, for example a substantially elliptical shape. The engagement pin 49 is inserted into the guide hole 33c.

The rotation transmission mechanism 35 transmits the rotation from the drive shaft 23 to the first pulley 37. Specifically, as shown in FIG. 2 and FIG. 3, the rotation transmission mechanism 35 comprises a first gear 35a and a second gear 35b. The first gear 35a is mounted to the drive shaft 23 so as to be integrally rotatable. The second gear 35b meshes with the first gear 35a. A shaft portion 36 is mounted to the second gear 35b so as to be integrally rotatable.

The first pulley 37 is rotated in conjunction with a winding operation of the handle 13. Specifically, as shown in FIG. 2 and FIG. 3, the first pulley 37 comprises a first cylindrical portion 37a and a first tooth portion 37b. The first cylindrical portion 37a is rotatably mounted with respect to the housing 33. For example, as shown in FIG. 3, both ends of the first cylindrical portion 37a are each rotatably mounted to the pair of first hole portions 33a. The shaft portion 36 is inserted in the inner perimeter part of the first cylindrical portion 37a. The first cylindrical portion 37a is integrally rotatable with the shaft portion 36. The first tooth portion 37b is disposed on the outer perimeter part of the first cylindrical portion 37a.

The second pulley 39 is rotated in conjunction with the rotation of the first pulley 37. Specifically, as shown in FIG. 2 and FIG. 3, the second pulley 39 is arranged spaced apart from the first pulley 37 along the axial direction. The second pulley 39 comprises a second cylindrical portion 39a and a second tooth portion 39b. The second cylindrical portion 39a is rotatably mounted with respect to the housing 33. For example, both ends of the second cylindrical portion 39a are each rotatably mounted to the pair of second hole portions 33b of the housing 33. The second tooth portion 39b is disposed on the outer perimeter part of the second cylindrical portion 39a. Meanwhile, the second cylindrical portion 39a may be a hollow columnar portion as well.

As shown in FIG. 2, the belt 41 is bridged to the first pulley 37 and the second pulley 39, and transmits the rotation of the first pulley 37 to the second pulley 39. Specifically, the belt 41 comprises an annular portion 41a, a pair of protrusions 41b, and multiple recesses 41c. The annular portion 41a is a portion that is bridged to the first pulley 37 and the second pulley 39. The pair of protrusions 41b are disposed the outer perimeter part of the annular portion 41a. The engagement pin 49 is engaged between the pair of protrusions 41b. Multiple recesses 41c are disposed on the inner perimeter part of the annular portion 41a. A first tooth portion 37b of the first pulley 37 and the second tooth portion 39b of the second pulley 39 are meshed with multiple recesses 41c.

The slider 43 engages with the belt 41 and is reciprocated in the axial direction accompanying the actuation of the belt 41. Specifically, as shown in FIG. 2 and FIG. 3, the slider 43 comprises a slider body 44, a first mounting portion 45, and a second mounting portion 47. A groove portion 44a is disposed on the slider body 44. The groove portion 44a extends in a direction that crisscrosses with the spool shaft 17, for example, in the direction that is perpendicular to the spool shaft 17. The engagement pin 49, which is fixed between the pair of protrusions 41b of the belt 41, is disposed in the groove portion 44a. In this manner, the slider body 44 engages the belt 41 via the engagement pin 49.

As shown in FIG. 2, the spool shaft 17 is mounted to the first mounting portion 45. In particular, an end (rear end) of the spool shaft 17 is non-rotatably fixed to a non-circular hole portion 45a that is formed in the first mounting portion 45 by a fixing device, for example, a screw member. The guide shaft 51 is mounted to the second mounting portion 47. In particular, the guide shaft 51 is inserted in the second mounting portion 47 so that the slider 43 is movable in the axial direction along the guide shaft 51.

The engagement pin 49 engages the belt 41 and the slider 43. Specifically, as shown in FIG. 2 and FIG. 3, one end of the engagement pin 49 is fixed between the pair of protrusions 41b of the belt 41 by a fixing device, for example, an adhesive. The other end of the engagement pin 49 is inserted in a guide hole 33c of the housing 33, and engages the groove portion 44a of the slider 43. Thus, when the engagement pin 49 moves together with the belt 41 upon actuating the belt 41, the engagement pin 49 is moved along the groove portion 44a.

As shown in FIG. 1 and FIG. 2, the guide shaft 51 guides the slider 43 in the axial direction. The guide shaft 51 is disposed in the reel body 11 along the axial direction.

Operation of the Oscillating Mechanism

Here, the operation of the above-described oscillating mechanism 31 will be described.

When the handle 13 is rotated, the drive gear 25 is rotated together with the drive shaft 23. Then, the pinion gear 27, which meshes with the drive gear 25, is rotated, and the rotor 21 is rotated on the outer perimeter side of the spool 19 by this rotation.

On the other hand, when the handle 13 is rotated, the rotation transmission mechanism 35 (first gear 35a and a second gear 35b) is actuated together with the drive shaft 23. Then, the rotation of the drive shaft 23 is transmitted to the first pulley 37 via the rotation transmission mechanism 35. Then, the first pulley 37 and the second pulley 39 are rotated via the belt 41.

Here, when the first pulley 37 and the second pulley 39 are rotated, the belt 41 is rotated around the first pulley 37 and the second pulley 39 while being bridged between the first pulley 37 and the second pulley 39. At this time, one end of the engagement pin 49 moves around the first pulley 37 and the second pulley 39 together with the belt 41. Further, at this time, the other end of the engagement pin 49 is reciprocated along the groove portion 44*a*, while being engaged with the groove portion 44*a* of the slider 43 (refer to the arrows in FIG. 2 and FIG. 3). Then, the slider 43 is reciprocated in the axial direction.

In this manner, when the slider 43 is reciprocated in the axial direction, the spool shaft 17 to which the slider 43 is fixed is also reciprocated in the axial direction. That is, the spool 19 is reciprocated relative to the rotor 21. Since the rotor 21 is rotated on the outer perimeter side of the spool 19 at this time, le fishing line is wound onto the spool 19 by the rotation of the rotor 21.

(1) The oscillating mechanism 31 comprises the first pulley 37, the second pulley 39, the belt 41, and the slider 43. The first pulley 37 is rotated in conjunction with a winding operation of the handle 13. The second pulley 39 is arranged spaced apart from the first pulley 37 along the axial direction. The belt 41 is bridged across the first pulley 37 and the second pulley 39, and transmits the rotation of the first pulley 37 to the second pulley 39. The slider 43 engages the belt 41 and is reciprocated in the axial direction accompanying the actuation of the belt 41.

In the oscillating mechanism 31, when a winding operation of the handle 13 is carried out, the first pulley 37 is rotated in conjunction with the winding operation. Then, the second pulley 39 is rotated via the belt 41. Then, the slider 43, which is engaged with the belt 41, is reciprocated in the axial direction.

Thus, in the oscillating mechanism 31, the movement amount of the slider 43 in the axial direction, that is, the stroke amount of the spool 19, is set by adjusting the interval between the first pulley 37 and the second pulley 39 in the axial direction. For example, the stroke amount of the spool 19 is increased as the above-described interval is increased. In this manner, it is possible to increase the stroke amount of the spool 19 without changing the size of the oscillating mechanism 31 in the direction that is perpendicular to the spool shaft 17. That is, compared with the conventional technology, the size of the oscillating mechanism 31 can be reduced in the direction that is perpendicular to the spool shaft 17.

(2) The oscillating mechanism 31 further comprises the engagement pin 49. The engagement pin 49 preferably engages the belt 41 and the slider 43.

In this case, the belt 41 and the slider 43 are engaged by the engagement pin 49. Thus, it is possible to reliably reciprocate the slider 43 in the axial direction by the engagement pin 49, when actuating the belt 41.

(3) In the oscillating mechanism 31, the belt 41 preferably comprises the annular portion 41*a* and the protrusion 41*b* disposed on the outer perimeter part of the annular portion 41*a*. The engagement pin 49 engages the protrusion 41*b*.

In this case, the engagement pin 49 can be easily disposed on the outer perimeter part of the annular portion 41*a* of the belt 41 via the protrusion 41*b* of the belt 41.

(4) In the oscillating mechanism 31, the belt 41 preferably comprises the annular portion 41*a* and the pair of protrusions 41*b* that are disposed on the outer perimeter part of the annular portion 41*a*. The engagement pin 49 is engaged between the pair of protrusions 41*b*.

In this embodiment, the engagement pin 49 can be more easily disposed on the outer perimeter part of the annular portion 41*a* of the belt 41 via the protrusions 41*b* of the belt 41.

(5) In the oscillating mechanism 31, the slider 43 preferably comprises the groove portion 44*a* that extends in a direction that crisscrosses with the spool shaft 17. The engagement pin 49 engages the groove portion 44*a* so as to be movable along the groove portion 44*a*.

With the spool shaft 17, it is possible to set the stroke amount of a spool without changing the length of the groove portion 44*a*, by adjusting the interval between the first pulley 37 and the second pulley 39 in the axial direction. That is, compared with the conventional technology, the size of the oscillating mechanism 31 can be reliably reduced in the direction that is perpendicular to the spool shaft 17.

(6) In the oscillating mechanism 31, the belt 41 preferably comprises the annular portion 41*a* and the recess 41*c* disposed on the inner perimeter part of the annular portion 41*a*. The first pulley 37 comprises the first tooth portion 37*b* that meshes with the recess 41*c*.

In this embodiment, the rotation of the first pulley 37 can be reliably transmitted to the annular portion 41*a* of the belt 41 by the meshing of the first tooth portion 37*b* and the recess 41*c*.

(7) In the oscillating mechanism 31, the second pulley 39 preferably comprises the second tooth portion 39*b* that meshes with the recess 41*c*.

In this embodiment, the rotation of the first pulley 37 can be reliably transmitted from the annular portion 41*a* of the belt 41 to the second pulley 39 by the meshing of the second tooth portion 39*b* and the recess 41*c*.

(8) The oscillating mechanism 31 preferably further comprises the housing 33. The housing 33 is capable of housing the first pulley 37, the second pulley 39, and the belt 41.

In this embodiment, since the belt 41 is guided by the housing 33, even if a failure occurs when the slider 43 (spool shaft 17) is moved in the axial direction and sagging or the like occurs in the belt 41, disengagement (becoming unmeshed) from the first pulley 37 and the second pulley 39 can be prevented.

(9) The oscillating mechanism 31 for a fishing reel according to another aspect of the present invention preferably further comprises the rotation transmission mechanism 35 (for example, a first gear 35*a* and a second gear 35*b*). The rotation transmission mechanism 35 transmits the rotation from the drive shaft 23, which is rotated in conjunction with a winding operation of the handle 13, to the first pulley 37.

In this embodiment, even if the drive shaft 23 and the first pulley 37 are arranged to be separate from each other, the rotation from the drive shaft 23 can be reliably transmitted to the first pulley 37 by the rotation transmission mechanism 35.

Figure 4:
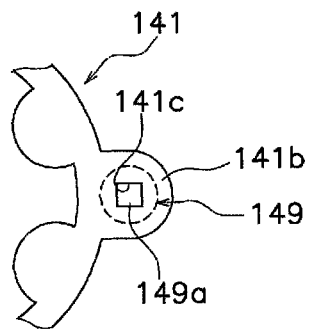
FIG. 4 is a view showing an engaged state of an engaging pin in another embodiment of the present invention.

OTHER EMBODIMENTS (A) In the embodiment described above, an example was shown in which the engagement pin 49 is fixed between the pair of protrusions 41*b*. Alternatively, as shown in FIG. 4; one protrusion 141*b* may be disposed on a belt 141, and an engagement pin 149 may be engaged with the protrusion 141*b*. In this embodiment, for example, one end 149*a* of the engagement pin 149 is formed in a non-circular shape, such as a rectangular shape. A hole 141*c*, with which one end 149*a* of the engagement pin 149 can engage, is disposed on the protrusion 141b. One end 149a of the engagement pin 149 is fixed to the hole 141c by a fixing device, for example, an adhesive.

(B) In the embodiment described above, an example was shown in which the engagement pin 49 is fixed between the pair of protrusions 41b. Alternatively, the engagement pin 49 may be integrally formed with the belt 41.

Figure 5:
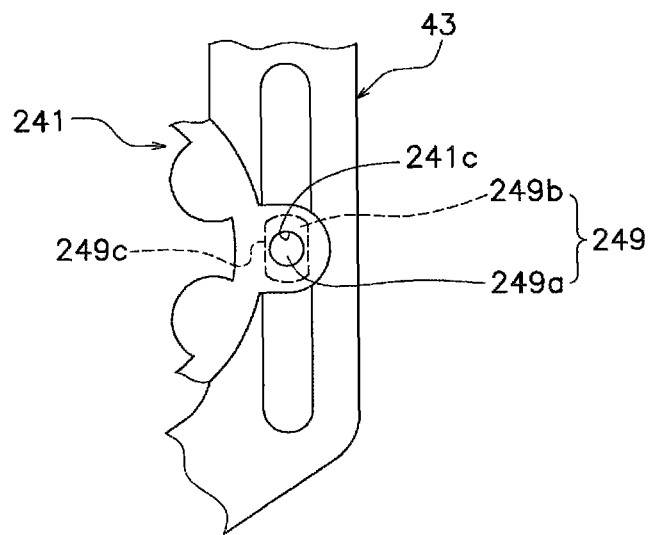
FIG. 5 is a view showing an engaged state of an engaging pin in another embodiment of the present invention.

(C) In the embodiment as well as another embodiment (A) described above, an example was shown in which the engagement pin 49 engages the protrusion 41b. Alternatively, as shown in FIG. 5, an engagement pin 249 may be rotatably engaged with a protrusion 241b.

In this case, one end 249a of the engagement pin 249 is rotatably mounted with respect to a hole 241c disposed on the protrusion 241b. One end 249a of the engagement pin 249 is formed, for example, in a circular shape. Further, the other end 249b of the engagement pin 249 comprises a pair of straight portions 249c with respect to each of a pair of wall portions of a groove portion 244a. In this embodiment, if the engagement pin 249 is moved together with the belt 241, the other end 249b of the engagement pin 249 is moved along the wall portions of the groove portion 44a. while the one end 249a of the engagement pin 249 rotates in the hole portion 241c. The oscillating mechanism 31 can be operational when configured in this manner as well.

(D) In the embodiment described above, an example was shown in which the pair of protrusions 41b are disposed on the outer perimeter part of the annular portion 41a in the belt 41. However, multiple protrusions 41b may be disposed around the entire outer perimeter of the annular portion 41a as well.

What is claimed is:

1. A reciprocating mechanism for a fishing reel, comprising:
   a first rotating body configured to rotate in conjunction with a winding operation of a handle of the fishing reel;
   a second rotating body arranged spaced apart from the first rotating body along a spool shaft direction in which a spool shaft of the fishing reel extends;
   a rotation transmission body bridged between the first rotating body and the second rotating body, and configured to transmit the rotation of the first rotating body to the second rotating body; and
   a movable body configured to engage the rotation transmission body, and configured to reciprocate a spool in the spool shaft direction accompanying an actuation of the rotation transmission body.

2. The reciprocating mechanism for the fishing reel recited in claim 1, further comprising:
   an engagement body configured to engage the rotation transmission body and the movable body.

3. The reciprocating mechanism for the fishing reel recited in claim 2, wherein
   the movable body comprises a groove portion extending in a direction that crisscrosses with the spool shaft, and
   the engagement body engages with the groove portion so as to be movable along the groove portion.

4. The reciprocating mechanism for the fishing reel recited in claim 1, wherein
   the rotation transmission body comprises an annular portion and a recess disposed on an inner perimeter part of the annular portion, and
   the first rotating body comprises a first tooth portion that meshes with the recess.

5. The reciprocating mechanism for the fishing reel recited in claim 4, wherein
   the second rotating body comprises a second tooth portion that meshes with the recess.

6. The reciprocating mechanism for the fishing reel recited in claim 1, further comprising
   a housing configured to house the first rotating body, the second rotating body, and the rotation transmission body.

7. The reciprocating mechanism for the fishing reel recited in claim 1, further comprising
   a rotation transmission mechanism configured to transmit rotation from a drive shaft, which is rotated in conjunction with the winding operation of the handle, to the first rotating body.

8. A reciprocating mechanism for a fishing reel, comprising:
   a first rotating body configured to rotate in conjunction with a winding operation of a handle of the fishing reel:
   a second rotating body arranged spaced apart from the first rotating body along a spool shaft direction in which a spool shaft of the fishing reel extends;
   a rotation transmission body bridged between the first rotating body and the second rotating body, and configured to transmit the rotation of the first rotating body to the second rotating body, the rotation transmission body comprising an annular portion and a protrusion disposed on an outer perimeter part of the annular portion;
   a movable body configured to engage the rotation transmission body, and configured to reciprocate in the spool shaft direction accompanying an actuation of the rotation transmission body; and
   an engagement body configured to engage the rotation transmission body and the movable body, and being configured to engage the protrusion.

9. The reciprocating mechanism for the fishing reel recited in claim 8, wherein
   the engagement body is engaged between a pair of protrusions.

* * * * *